July 21, 1925.
C. J. LAUNDRIE
1,546,843
TIRE RIM TOOL
Filed Nov. 28, 1924
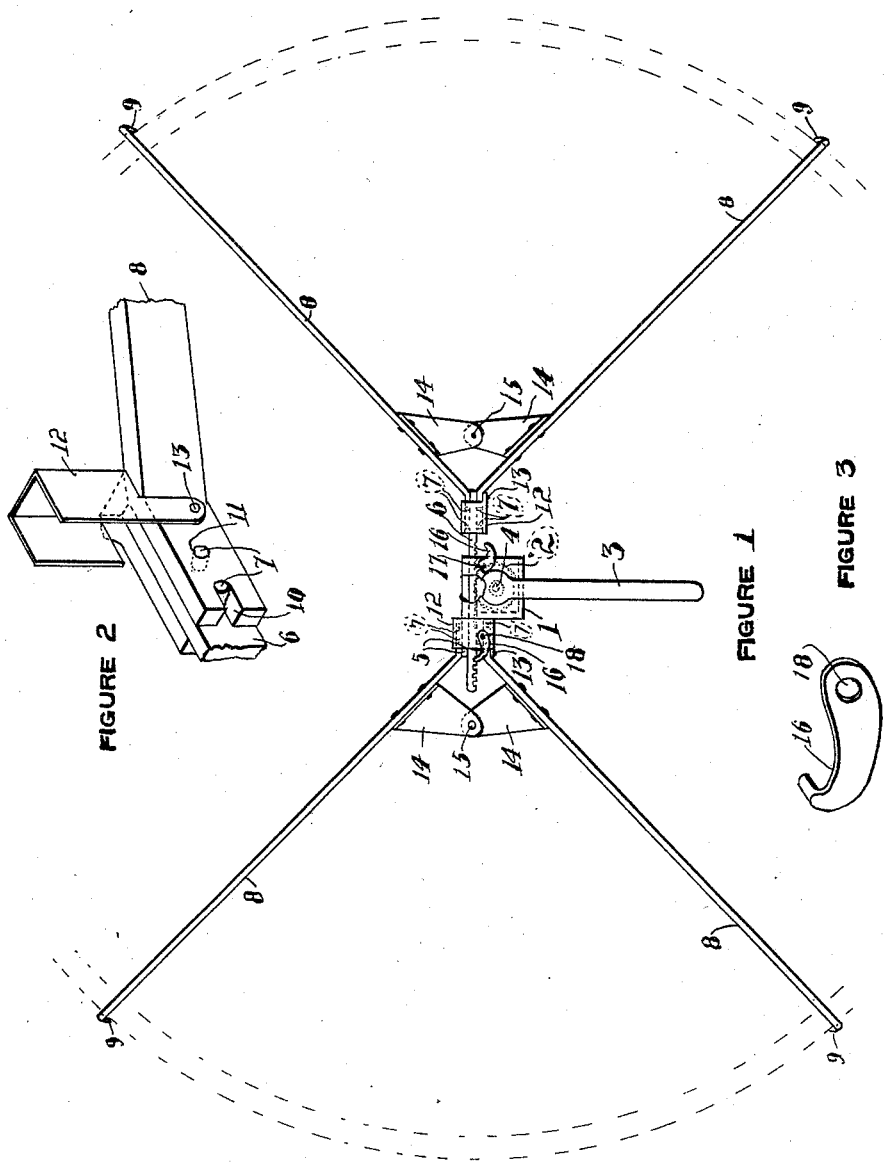
INVENTOR
Charles J Laundrie
BY John A. Naismith
ATTORNEY Patented July 21, 1925.

1,546,843

UNITED STATES PATENT OFFICE.

CHARLES J. LAUNDRIE, OF SAN JOSE, CALIFORNIA.

TIRE-RIM TOOL.

Application filed November 28, 1924. Serial No. 752,713.

*To all whom it may concern:*

Be it known that I, CHARLES J. LAUNDRIE, a citizen of the United States, and a resident of San Jose, in the county of Santa Clara and State of California, have invented certain new and useful Improvements in Tire-Rim Tools, of which the following is a specification.

This invention relates particularly to a tool for contracting or expanding a rim for the removal or replacement of a tire thereon.

It is one object of my invention to provide a simple mechanism for the purpose indicated that may be quickly adjusted for use on rims of various diameters, and one that may be easily and quickly collapsed into a compact package.

It is a further object of the invention to provide a device of the character indicated that will be simple in construction and operation, economical to manufacture, and highly efficient in its practical application.

In the drawing:—

Figure 1 is a plan view of the device in an operative position contracting a tire rim.

Figure 2 is a perspective illustration of a portion of the device illustrating the method of securing the tire rim engaging bars to a common support.

Figure 3 is a detail perspective illustration of one of the locking dogs.

Referring more particularly to the drawing, I show at 1 a casting having a gear or pinion 2 revolubly mounted therein and rotated by means of a suitable lever 3 mounted upon its shaft 4.

The casing 1 has a pair of parallel extensions formed thereon as shown at 5—5.

Mounted to slide in case 1 between said parallel extensions 5—5 is a rack 6 engaging said gear 2 and moved in either direction through case 1 by the rotation thereof.

Upon either side of rack 6 and at one end thereof are provided spaced pins as shown at 7—7.

At 8—8—8—8 are shown four bars, each provided with a hook as 9 on one end and having its opposite end bent at an angle thereto and provided with a notch as 10 and an orifice 11.

Two of these arms also have collars as 12 pivotally mounted thereon as at 13, these collars in the present case being of different widths for the purpose hereinafter set forth.

On the inner sides of bars 8 and adjacent to their notched ends are ears 14, each opposing pair of ears being riveted together as at 15.

When the device is disassembled the two bars of each pair of bars 8—8 may be pivotally adjusted relative to each other and thereby collapsed into an exceedingly small space for packing.

In assembling the device, one pair of bars 8—8 is spread and the notch and orifice in each of the said bars brought into engagement with one of the set of pins 7—7 on the end of ratchet 6, and the collar 12 swung down over the engaged parts as shown in Figure 1, thereby securely binding the two bars to ratchet 6 in their proper position without the use of nuts, bolts, screws or similar fastenings that require considerable time to place or remove.

The other pair of bars 8—8 are now similarly spread and secured on pins 7—7 on extensions 5 and secured by a collar 12.

The rack 6 is now thrust through case 1 and handle 3 turned until the hooked arms 8 engage the rim 16. Further turning of the handle 3 will draw the opposing pairs of arms 8 toward each other and effectually contract the tire rim as desired.

In disassembling for storing or packing it is only necessary to swing back collars 12, which permits the detaching and folding of arms 8—8.

It may be readily seen from the foregoing that the device is extremely simple in construction and economical to manufacture, and only a few moments are required to assemble and disassemble it. Furthermore, the pull on the opposing pairs of bars is direct and the construction permits the wide spreading of bars 8, and the device may be as easily and quickly applied in emergency cases on the road as in the shop.

Since it is desirable to provide some means of locking the rim in either a contracted or an expanded position, I have provided dogs 16 for engaging the teeth of ratchet 6 and secure it against movement.

One dog 16 is pivotally mounted on case 1 as at 17 and may be thrown into engagement with the ratchet 6 when the hooks 9 are placed within the rim and the same expanded, thereby effectively locking it in that position. The other dog 16 is pivotally mounted on one collar 12 as at 18 and may be thrown into engagement with ratchet 6 when rim is contracted thereby effectively locking it in that position.

It is to be understood, of course, that while I have herein shown and described one specific embodiment of the invention, changes in form, construction and method of operation may be made within the scope of the appended claim.

I claim:

A rim tool comprising a support, a pinion mounted thereon and means for rotating said pinion, a rack engaging the pinion and slidably engaging the support, laterally extending pins mounted upon said rack and said support, a pair of outwardly diverging rim engaging elements engaging the pins on the rack and means for locking said elements in engagement with said pins, a pair of outwardly diverging rim engaging elements engaging the pins on said support and means for locking said elements in engagement with said pins.

CHARLES J. LAUNDRIE.